No. 826,116. PATENTED JULY 17, 1906.
C. SAUNDERS.
SAFETY GASOLENE MEASURING TANK.
APPLICATION FILED APR. 3, 1905.
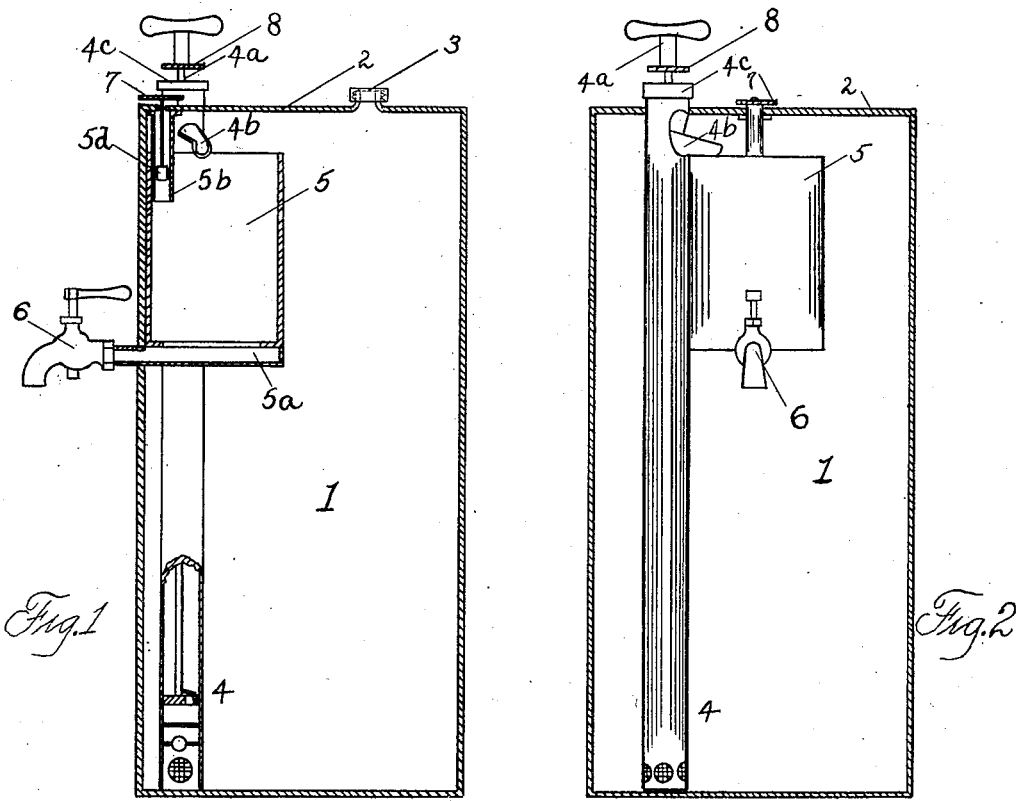
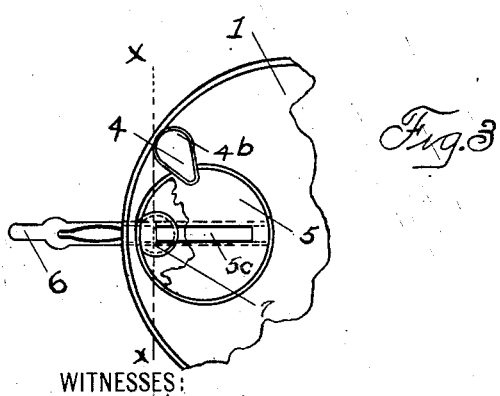
WITNESSES:
Roy Wallis.
J. R. Mansfield.
INVENTOR
Charles Saunders.
BY
Geo. B. Wilcox ATTORNEY

UNITED STATES PATENT OFFICE.

CHARLES SAUNDERS, OF SAGINAW, MICHIGAN.

SAFETY GASOLENE-MEASURING TANK.

No. 826,116.

Specification of Letters Patent.

Patented July 17, 1906.

Application filed April 3, 1905. Serial No. 253,495.

*To all whom it may concern:*

Be it known that I, CHARLES SAUNDERS, a citizen of the United States, residing at Saginaw, in the county of Saginaw and State of Michigan, have invented certain new and useful Improvements in Safety Gasolene-Measuring Tanks; and I do hereby declare the following to be a full, clear, and exact description of the invention, such as will enable others skilled in the art to which it appertains to make and use the same.

This invention is a device for measuring gasolene and other volatile explosive liquids.

Being aware of the great danger of explosion from gasolene-vapors, the object of my invention is to so construct a gasolene-measuring tank that it will prevent the escape of gasolene-vapor, except possibly in such small amounts as to be practically harmless, and to make the tank as safe as possible against leakage through accident or carelessness. Such leakage is apt to occur when the common form of tank having a faucet at its bottom is used.

A further object of my invention is to so construct the tank that it shall be easy and convenient to operate and that it will not be liable to get out of repair during the natural life of the tank.

The means consists in certain devices, their combinations and arrangements, and the equivalents thereof shown in the accompanying drawings, in which—

Figure 1 is a vertical section broken away in part, and Fig. 2 is a part vertical section taken on the line $x$ $x$ of Fig. 3. Fig. 3 is a partial plan view with the top of the tank removed.

As is clearly shown in the drawings, the device consists of an outer storage-tank 1, having a tight top 2, provided with a screw-cap 3 or similar means for filling the tank. Within the tank 1 is a vertical plunger-pump 4, having its plunger-rod $4^a$ extending through the top 2 of the tank. A discharge-spout $4^b$ is located just below the top 2 of and within the tank and is arranged to discharge into a measuring vessel 5, mounted inside the tank 1 near its top. The vessel 5 is of unit capacity—say one gallon—and is provided near its bottom with a draw-off valve 6, by which the contents of vessel 5 can be delivered outside the tank 1.

To impart additional strength to the bottom of the vessel 5 and to prevent the vessel from becoming displaced when empty and surrounded by gasolene and also to form a convenient attachment for the draw-off valve 6, I have secured to the bottom of the vessel 5 by soldering or otherwise a tube or trough $5^a$, as shown in Fig. 1, communicating with the vessel 5 by means of a slot, as shown at $5^c$ in Fig. 3. The draw-off valve 6 is secured to the projecting end of the tube.

For the purpose of indicating when the vessel 5 is filled or nearly filled I provide a float-gage $5^d$, the float of which is normally suspended just below the level of the top of the vessel 5, so that when the vessel is full the float rises slightly. The float is contained in and guided by a downwardly-projecting tube $5^b$, secured to the under side of the top 2, said tube being open at its lower end, and at the top of the gage is secured a flexible washer 7, which closes the tube opening when the valve 6 is opened and a small amount of gasolene is drawn from the vessel 5.

To form a tight joint between the opening in the top 2 and the pump-plunger rod $4^a$, I provide a similar washer 8. When the pump is not in use, this washer 8 rests upon a cap $4^c$ on the projecting end of the pump-barrel, as shown in Fig. 1, making a joint sufficiently tight to prevent the escape of vapor.

By the means above described I have produced a gasolene-tank that is at all times sufficiently tight to prevent the escape of vapor, that permits a unit quantity of liquid to be withdrawn at a time, and insures that a great quantity cannot be taken out as a result of mistake in measuring. This latter result is obtained by making the tank 5 of just sufficient capacity to contain a unit charge. Any surplus overflows into the tank 1 over the edge of receptacle 5.

It will be noted that the only part of my device which is at all liable to get out of order is the pump-plunger, and by the construction shown in the drawings the pump-plunger can be withdrawn by simply unscrewing the screw-cap $4^c$ at the top of the tank and drawing the plunger out of the barrel.

What I claim as my invention, and desire to secure by Letters Patent, is as follows:

The combination in a tank, with a measuring-receptacle located near the upper end thereof, a pump discharging directly into the receptacle, means for emptying the receptacle, a pipe open at its lower end and depending into the receptacle, the pipe being supported by the tank and inclosing an aperture in the tank, a gage-rod received in the tank and extending through the aperture in the tank and a flexible valve carried by the rod and normally adapted to close the aperture in the tank.

In testimony whereof I affix my signature in presence of two witnesses.

CHARLES SAUNDERS.

Witnesses:
  ROY WALLIS,
  J. R. MANSFIELD.